Dec. 18, 1951 W. JOSEPHIAN 2,579,003
VEHICLE CONSTRUCTION
Filed July 19, 1947 2 SHEETS—SHEET 2
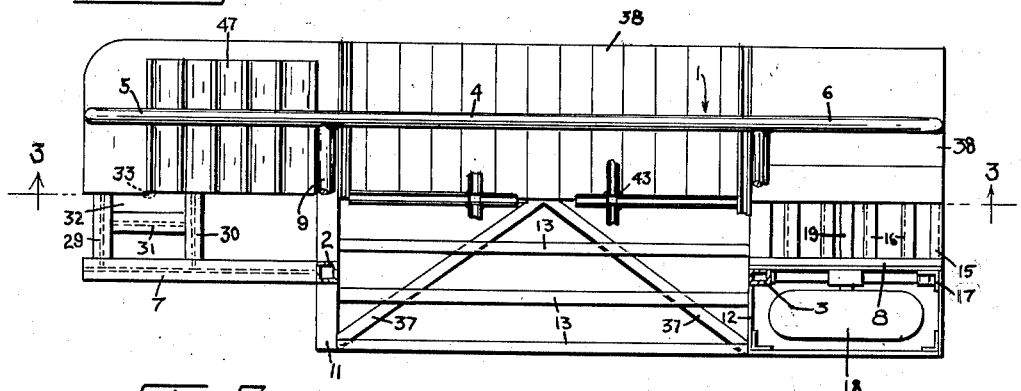
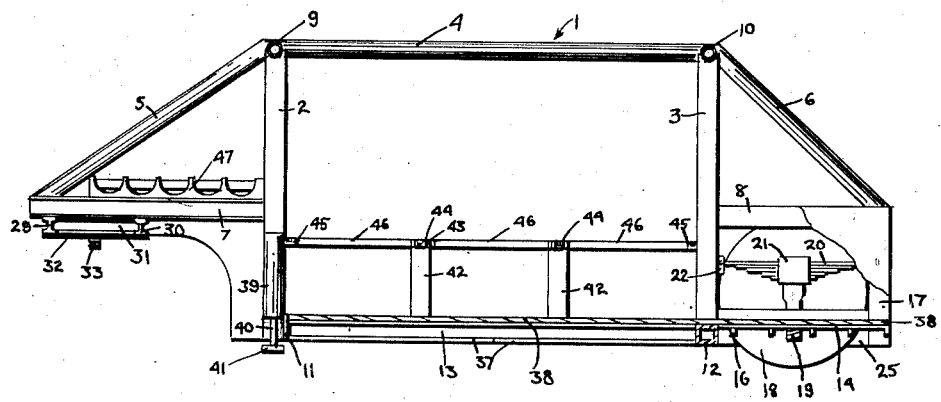
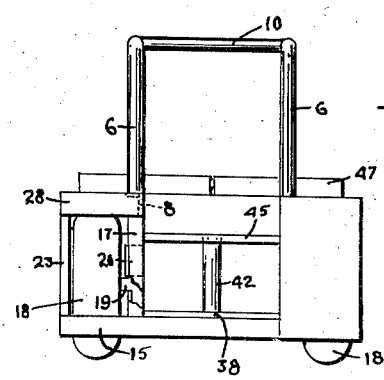
INVENTOR.
WILLIAM JOSEPHIAN
BY Boyken, Mohler & Beckley
ATTORNEYS Patented Dec. 18, 1951

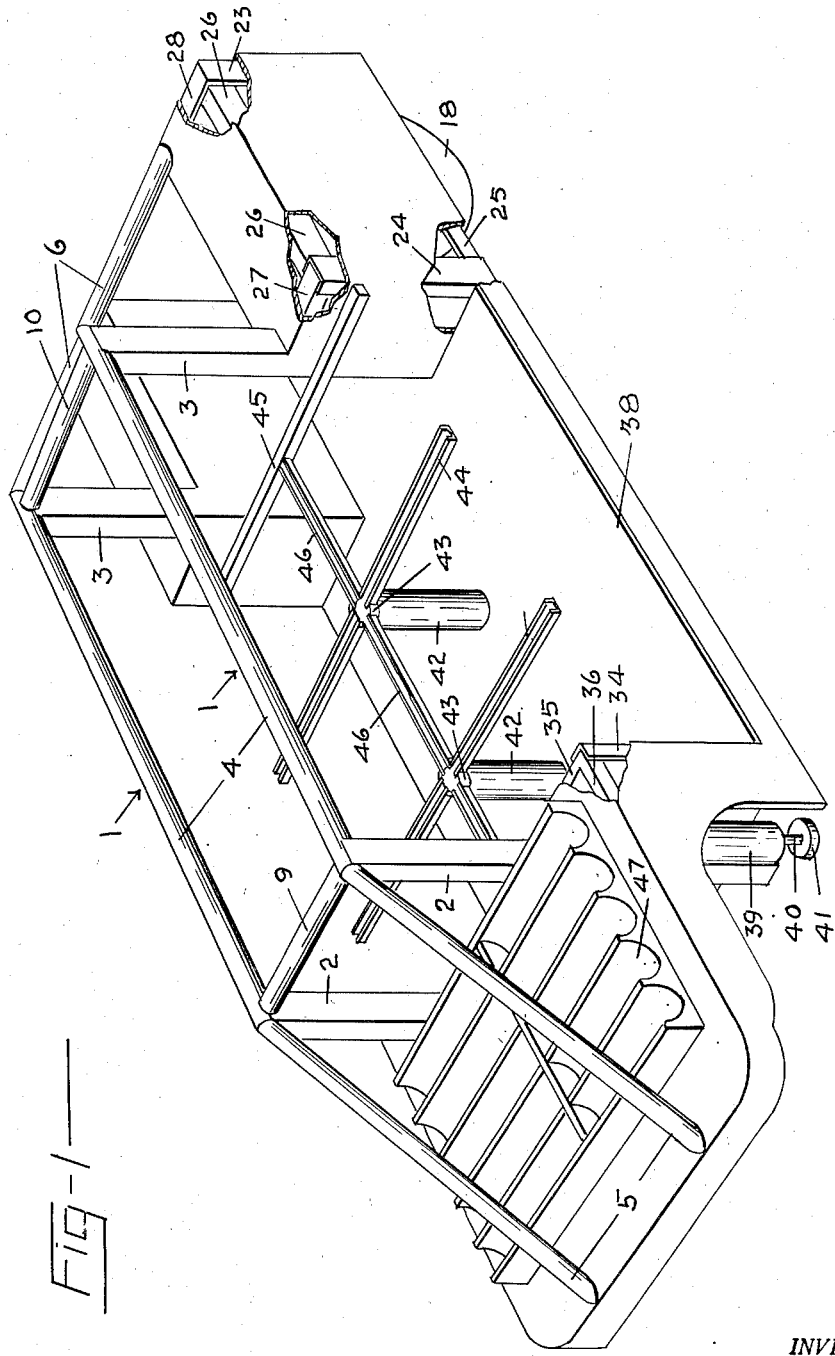

2,579,003

UNITED STATES PATENT OFFICE 2,579,003

VEHICLE CONSTRUCTION

William Josephian, Oakland, Calif.

Application July 19, 1947, Serial No. 762,052

5 Claims. (Cl. 280—2)

This invention relates to the construction of trucks and trailers and particularly to those of a type having low beds capable of transporting very heavy loads.

In the past where it has been desirable to transport very heavy loads, trucks and trailer beds have usually been built some distance above the ground in order to accommodate the underlying structure carrying the load. This type of construction is often inconvenient and labor-wasting as it requires the load to be raised and lowered to the level of the bed. The difficulty is not overcome by the use of relatively solid overhead panels at the side or ends to carry the load because it was still necessary to lift the cargo over the panels to load and unload the vehicle.

Another disadvantage of low bed units with overhead structure has been that access was usually permitted only from the rear so that particular portions of the cargo could not be unloaded without unloading or lifting the desired portion over the remainder.

The present invention is one designed to overcome these difficulties and to provide a low truck or trailer bed which is capable of carrying relatively heavy loads.

Another object of the invention is a truck or trailer bed constructed very near to the ground and having maximum access from the ends and sides.

A further object of the invention is a truck or trailer bed constructed very near to the ground and supported by overhead trusses.

An even further object of the invention is a truck or trailer bed constructed very near to the ground, supported by open overhead trusses positioned away from the edges of the bed.

Still another object of the invention is a truck or trailer bed supported by an overhead truss which permits free and maximum access to the bed.

And yet another object of the invention is a truck or trailer bed having a transverse cantilever beam to provide substantially equal deflection at the center and sides of the bed.

In the drawings:

Fig. 1 is a perspective view of one form of trailer embodying the invention.

Fig. 2 is a plan view of the trailer shown in Fig. 1 with portions of the flooring and wheel coverings removed to show its construction.

Fig. 3 is a sectional view along the line 3—3 of Fig. 2.

Fig. 4 is a rear elevation of the trailer shown in Fig. 1 with portions of the wheel coverings removed to show its construction.

From what has been said above it is seen that the present invention is concerned with a truck or trailer bed construction which permits free and open access to heavy loads carried near the ground. From what follows it will be seen that the truss structure may be utilized in a variety of ways on either trucks or trailers. Only one form will be described in detail and it is one particularly designed for the transportation of heavy gas cylinders. However, the specific construction described is not intended as a limitation as modifications, depending upon the type of cargo to be carried, will be obvious to those skilled in the art. Particularly, the construction described and the claims are intended to refer to both truck and trailer construction.

The type chosen for illustration is one of all welded construction although other conventional means of connection might be utilized. Although the exact size of the trailer is not critical, the unit illustrated weighs 5,600 pounds and has been found to easily carry a pay load of 18,400 pounds, or 76.5% useful load only one foot off the ground, an excellent proportion for even a flat bed trailer. The trailer is 21½ feet long and seven feet wide and approximately seven feet high; which dimensions, taken with the figures above, indicate the results to be obtained from the dimensions given in the following description. Such dimensions are not, of course, to be taken as a limitation and they may be altered depending upon the pay load to be hauled and the conditions under which the hauling is done.

In general, as has been stated, the weight is carried by an overhead frame comprising a pair of trusses, generally designated 1. From the drawings, and particularly Fig. 3, each truss is seen to comprise a vertical front post 2 and a vertical rear post 3 (two six inch eight pound channels welded together). These are secured together, by welding, at their upper ends by upper cross member 4 (4" O. D. 11 ga. seamless steel tubing); and a pair of slanting brace members 5, 6 (of the same material) extend outwardly and downwardly at the ends. The outer end of brace 5 is secured to a horizontal beam 7 (6"—12.25 pound structural steel I beam) which extends backwardly and is welded to vertical post 2 approximately at the latter's midpoint. Similarly beam 8 (6"—8 pound channel) connects the rearward end of brace 6 to the midpoint of post 3.

The trusses 1 are connected at upper ends of the posts 2, 3 by a pair of upper transverse braces 9, 10 (4" O. D. 11 ga. seamless steel tubing) and a pair of lower transverse braces 11, 12 (6"— 12.25 pound structural steel I beam) connect the lower ends of posts 2, 3 but braces 11, 12 extend past the posts and outwardly from the sides thereof to extend the available floor space. In the trailer illustrated, the trusses were placed 42" apart with an overall width of the trailer 7 feet, to provide substantially equal deflection (on the cantilever principle) at the ends and center of the transverse braces.

Extending longitudinally between transverse braces 11, 12 are a series of equally spaced floor beams 13, one along the center line and three others on either side. The outer floor beam, together with transverse braces 11, 12 thus define the major floor area.

Extending rearwardly from the lower end of each post 3 is a secondary longitudinal floor brace 14 (4" x 3" x ¼ angle). The rearward ends of braces 14 terminate at and are secured to a secondary transverse beam 15 (5" x 3½" x 5/16" angle) which terminates past the braces 14 at the outside edge of the trailer for a purpose to be described. A series of short transverse floor beams 16 (2" x 2" x ¼") are secured at equal intervals between the longitudinal braces 14.

At the end of each of the braces 14 is a vertical member 17 (5" x 3½" x 5/16" angle), the upper end of which is welded to braces 6, 8. Thus, there is provided at each of the rearward corners of the trailer a space for a wheel. The wheels 18 are preferably mounted on a transverse axle 19 (3" square steel) shaped as shown in Figs. 3 and 4, although in certain types of construction they may be independently mounted. Adjacent each of the wheels, the axle is attached to a leaf spring 20 by means of spring clamps 21. The springs are, in turn suspended at their ends from a shackle and expansion link 22, welded to posts 3 and member 17. The axle 19 extends downwardly from each clamp 21 and extends across the trailer between a pair of the short floor beams 16, as may be seen in Fig. 2.

The wheels are enclosed by a framework comprising light angle iron vertical members 23, 24, longitudinal members 25, 26 and transverse members 27, 28. This frame work is preferably covered by light sheet metal to enclose the wheels, as shown in the drawings, although the side sheet may be secured on hinges (not shown) to make the wheel accessible.

The portion of the trailer forward of posts 2 has no provision for floor bracing. The forward ends of beams 7 are secured together by means of a pair of transverse members 29, 30 which are in turn braced by a pair of longitudinal beams 31 (all of 4" 7.7 pound structural steel I beam). A steel plate 32 is welded to the lower face of these units, as shown in Fig. 3, which plate carries a conventional pivot unit 33 for connection to the truck, not shown.

A framework comprising vertical members 34, transverse member 35 and a member 36 are utilized to support a sheet metal covering, as shown in the drawings, for this front portion of the trailer. The sides may be cut away as shown to permit proper turning of the truck wheels when it is attached to haul the trailer.

To assist in preventing twisting of the floor during operation, a pair of tie rods 37 (⅜" H. R. steel) are welded to the bottom of members 13, extending from opposite corners, as shown in Fig. 2. In addition, the floor of the truck, both the main area and the open area between the rear wheels is covered with planking 38 to support the load.

When the trailer is not connected to a truck by pivot 33, it may be left in position for loading and unloading. A conventional landing gear is provided to support the forward end by attaching the fixed portion of the gear 39 to each of the forward posts 2 as can be seen in Fig. 3. The gear is provided with a downwardly extending column 40 which carries a resting plate 41 on its lower end. This unit may be operated automatically or manually, as desired.

Although not limited to such purpose, the truck shown is primarily designed for the purpose of transporting heavy gas cylinders. To insure proper loading of such cylinders a pair of upright posts 42 are secured through the planking 38 to central member 13. These members each carry a ring 43 at their upper ends and hingedly support a pair of transverse guides 44 and longitudinal guides 46. When not in use, the guides may be folded upwardly in line with the posts. Additional guides 45 are provided on the covered end sections of the trailer which contain sockets to receive the free ends of the longitudinal guides 46. If desired, these various guides may be formed of channel iron with lengths of chain or cable carried therein and releasable at one end for securing the load in place.

If desired, a multiple cradle 47 may be secured to the upper deck on the forward covered area, as shown in the drawings, to receive a plurality of small cylinders. This cradle is made to slope downwardly and inwardly from either side to prevent the small cylinders from slipping off during transportation.

From the foregoing description it is seen that the major weight of the load is carried by the paired cantilever trusses 1 (each comprising vertical posts 2, 3 longitudinal cross members 4, 13, slanting braces 5, 6 and members 7, 8). The trusses so formed carry the weight in a manner similar to those used in bridge construction and at the level of the lower end of the vertical posts 2, 3. When the trailer is built according to the illustrative dimensions and the load mentioned above is carried, there is less than ⅛" sag in the floor from the ends to the center and the cross members 4 sag only about the same amount. The rigidity to torque with the illustrated construction is such that when one wheel of the trailer is driven over a 5" rise, all other wheels being level, there is no discernable difference in alignment of the two sets of vertical columns 2, 3.

This overhead frame construction was designed in order to provide the greatest relative stiffness per unit weight and, at the same time, to give an unobstructed floor space of minimum thickness in order that there would be a minimum lift from the ground to the floor. In this connection, the direction of bracing of the floor in the rear is transverse in order that the axle may work up between members 16 and the floor could thus be carried nearer the ground. The longitudinal cross member 4 is over 6 feet above the floor so that this overhead portion does not present a hazard to personnel working the load.

Likewise the transverse spacing of the trusses leaves the maximum spacing between the wheels at the rear.

The trailer described easily handles 96 large oxygen cylinders (9⅛" in diameter x 50" long), 18 large acetylene cylinders (12⅜" in diameter x 36" long), and 10 small acetylene cylinders (8" in diameter x 36" long). In conventional trucks because of their great weight and varying sizes, such mixed loads could not easily be handled because they were difficult to tie into place and they tend to jar into one part of the trailer where they are difficult to extricate. By use of the guides the cylinders may be divided into groups which remain relatively stationary and appreciably reduce the labor in loading and unloading.

I claim:

1. In a vehicle having a low, flat horizontally disposed carrying bed; an upright longitudinally extending truss on said bed having an open central rectangular frame including a horizontally extending lower beam defining its lower side and posts at the ends of said beam defining the sides of said frame, truss members secured to said posts and extending oppositely outwardly and divergently downwardly relative to each other from the upper ends of said posts, truss pieces spaced above the level of said beam connecting the lower ends of said pieces with said posts respectively, a pair of coaxial ground wheels, an axle on which said wheels are supported for revolution on their common axis, means connecting said axle to said frame for supporting the said frame for movement over the ground, said truss members and said truss pieces being substantially above said axis and said beam being below said axis.

2. In a vehicle having a low, flat horizontally disposed carrying bed; an upright longitudinally extending truss on said bed having an open central rectangular frame including a horizontally extending lower beam defining its lower side and posts at the ends of said beam defining the sides of said frame, truss members secured to said posts and extending oppositely outwardly and divergently downwardly relative to each other from the upper ends of said posts, truss pieces spaced above the level of said beam connecting the lower ends of said pieces with said posts respectively, a pair of coaxial ground wheels, an axle on which said wheels are supported for revolution on their common axis, means connecting said axle to said frame for supporting the said frame for movement over the ground, said truss members and said truss pieces being substantially above said axis and said beam being below said axis, said means connecting said axle to said frame including a downward extension at the lower end of one of said truss members, a longitudinal extension at one end of said beam connected with said downward extension, and a spring secured to said axle and connected with the post adjacent said downward extension and with the latter.

3. In a vehicle having a pair of coaxial, spaced, ground wheels and an axle on which said wheels are mounted for rotation on their common axis; a pair of corresponding upright, longitudinally extending trusses disposed in parallel vertical planes in side by side relationship, each of said trusses comprising a lower and an upper beam and posts connecting the corresponding ends of said upper and lower beam thereby defining a rectangular frame, a truss member extending slantingly downwardly from each post at one of the said corresponding ends of said beams, and a horizontally extending truss piece substantially above the level of said beams connecting each truss member with the post with which it is connected at a level intermediate that of said beams, means connecting said axle with said frame adjacent said last mentioned corresponding ends of said beams with the axis of said wheels substantially above the level of said lower beams.

4. In a vehicle having a pair of coaxial, spaced, ground wheels and an axle on which said wheels are mounted for rotation on their common axis; a horizontal frame, a main floor on said frame, said frame and floor being in a position below the said axis, means connecting said frame with said axle for supporting said frame and said floor in said position, a pair of upright longitudinally extending corresponding trusses supported on and over said frame in spaced opposed side by side relationship, said trusses including corresponding triangular portions at one of their corresponding ends spaced above the level of said floor with such triangular portions including horizontally extending horizontally spaced truss members spaced above the level of said floor, a deck supported on said truss members for supporting a load thereon.

5. In a vehicle having a pair of coaxial, spaced, ground wheels and an axle on which said wheels are mounted for rotation on their common axis; a horizontal frame, a main floor on said frame, said frame and floor being in a position below the said axis, means connecting said frame with said axle for supporting said frame and said floor in said position, a pair of upright longitudinally extending corresponding trusses supported on and over said frame in spaced opposed side by side relationship, said trusses including corresponding triangular portions at one of their corresponding ends spaced above the level of said floor with such triangular portions including horizontally extending horizontally spaced truss members spaced above the level of said floor, a deck supported on said truss members for supporting a load thereon, and means carried by said truss members below said deck at a level above said floor for connecting said truss members with a truck adapted to be positioned below said truss members.

WILLIAM JOSEPHIAN.

REFERENCES CITED

The following references are of record in the file of this patent:

UNITED STATES PATENTS

| Number | Name | Date |
| --- | --- | --- |
| 485,262 | Dean | Nov. 1, 1892 |
| 1,896,717 | Mott | Feb. 7, 1933 |
| 1,973,030 | Webber | Sept. 11, 1934 |
| 2,061,673 | Robinson | Nov. 24, 1936 |
| 2,191,572 | Maier | Feb. 27, 1940 |

FOREIGN PATENTS

| Number | Country | Date |
| --- | --- | --- |
| 193,483 | Great Britain | Aug. 8, 1922 |